Sept. 24, 1946. E. A. H. BOWSHER ET AL 2,408,037
ELECTRICAL REMOTE INDICATING AND SUPERVISORY SYSTEM
Filed March 10, 1943 4 Sheets-Sheet 1
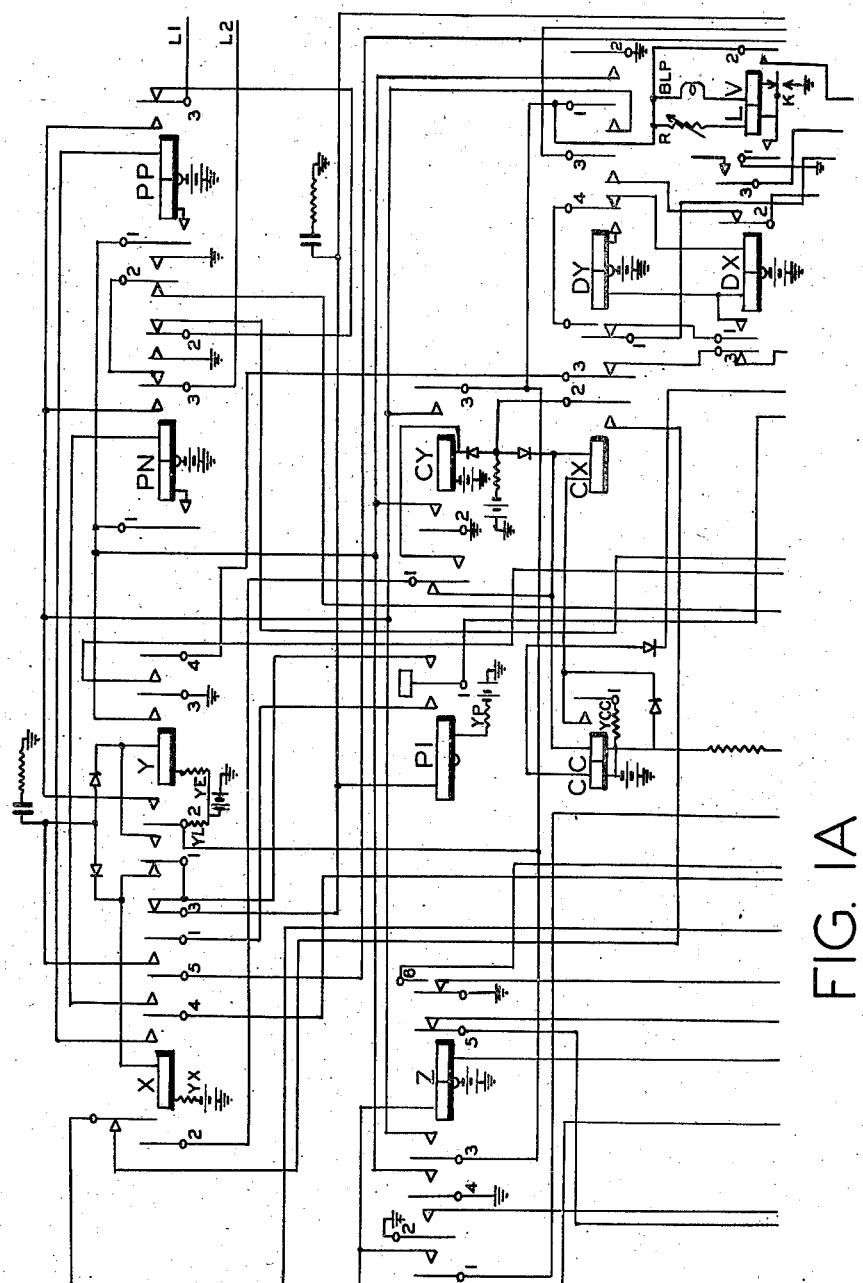
FIG. IA
INVENTORS
EDWARD ALBERT HENRY BOWSHER
HAROLD MOUNTJOY MUSCHAMP D'ASSIS FONSECA
HUGH JENNINGS WARD
ATTORNEY

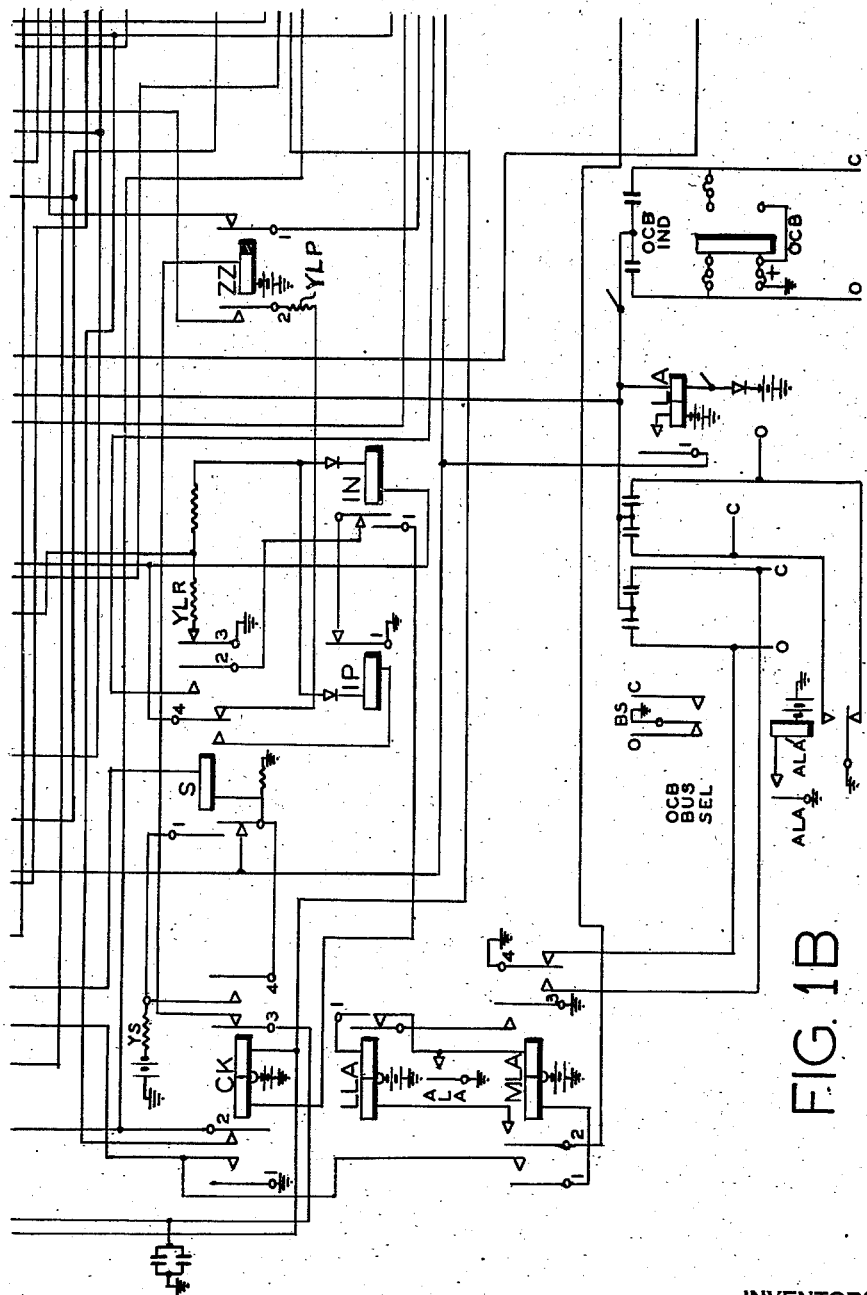

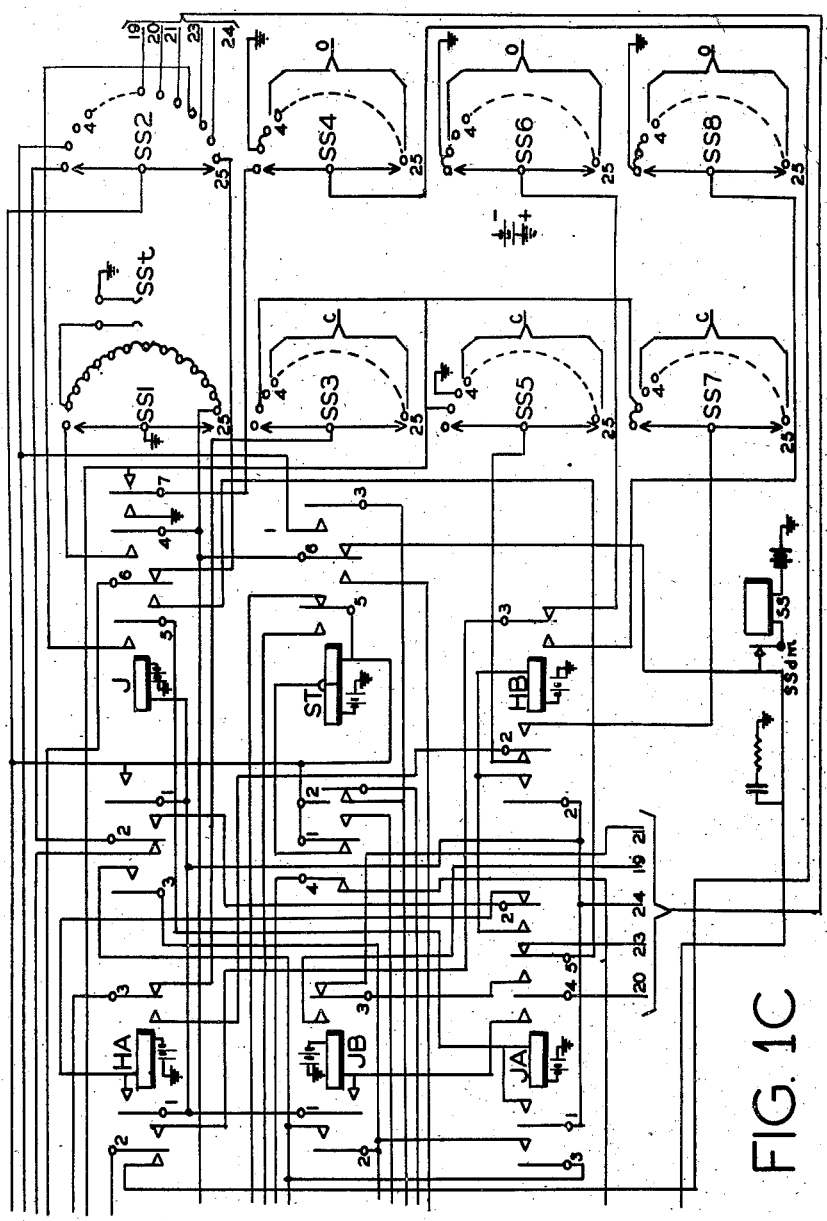

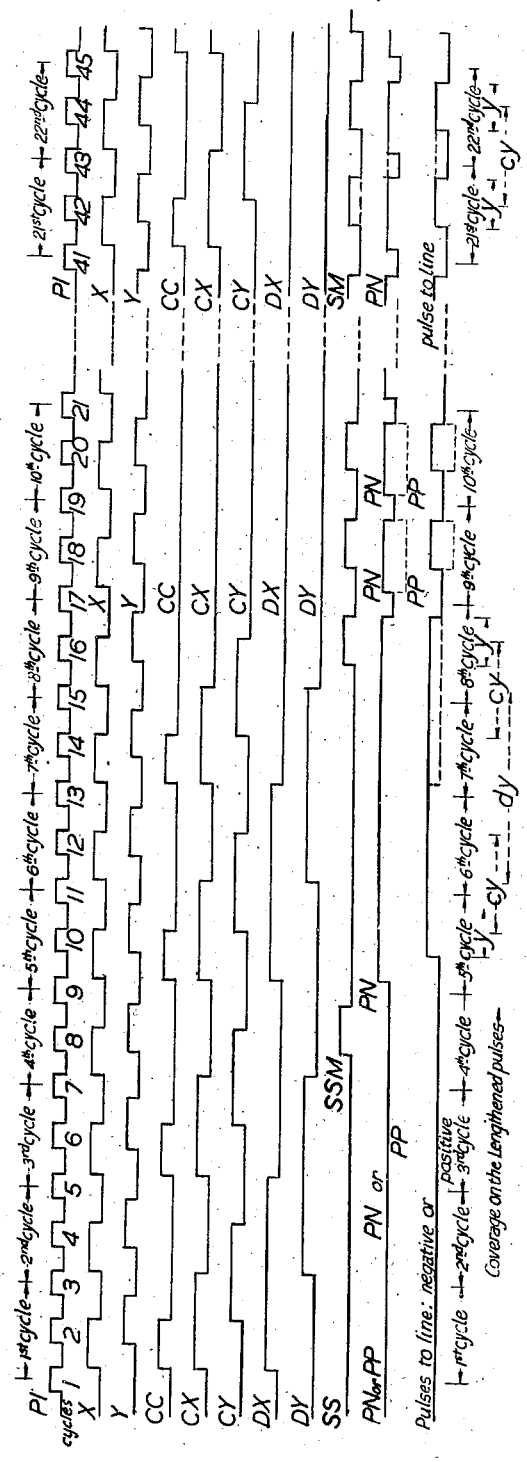

Patented Sept. 24, 1946

2,408,037

UNITED STATES PATENT OFFICE 2,408,037

ELECTRICAL REMOTE INDICATING AND SUPERVISORY SYSTEM

Edward Albert Henry Bowsher, Harold Mountjoy Muschamp d'Assis-Fonseca, and Hugh Jennings Ward, London W. C. 2, England, assignors, by mesne assignments, to International Standard Electric Corporation, New York, N. Y., a corporation of Delaware Application March 10, 1943, Serial No. 478,680
In Great Britain March 12, 1942

4 Claims. (Cl. 177—353)

This invention relates to electric signalling systems, and will be described in its application to electric power supply networks, where equipment, such as circuit breakers, located remotely from a central station, has to be controlled from that central station. By way of example, mention may be made of prior British patent specification Nos. 489,000 and 514,991 as disclosing electric remote control and/or supervisory systems which could make use of the present invention.

These systems serve to indicate at a central station of an electrical power distribution network the condition or position of apparatus at unattended stations of the network. Common supervisory signal receiving equipment at a central station is arranged to be connected automatically to any one of a number of different unattended stations which are connected by independent signal channels to the central station and to receive therefrom supervisory signals characteristic of the condition or position of a number of apparatus units thereat.

Preferably, any one of the different unattended stations is connected by independent signal channels to a tandem station which is connected to the central station and receives therefrom supervisory signals characteristic of the condition or position of a number of apparatus units thereat.

In this way indications from a substation are received of the condition or position of a number of switching and like devices and displayed simultaneously by means of a separate visual indicator per switching device.

Identifying equipment at the central station is adapted to identify an unattended station and to condition the common supervisory signal receiving equipment to receive supervisory signals characteristic of the condition or position of a number of apparatus units from said unattended station.

Each station includes a signal sender and a signal receiver; when the system is at rest, communication between the central control station and any substation can be initiated by either of them. When communication is initiated by the control station, the control sends out a signal distinctive of the one substation desired, and this signal, although received by all the substations, is effective only at that one. Further identity checking and like signals may be exchanged between the two interconnected stations; but eventually the substation will send back signals descriptive of the condition of each apparatus unit, e. g. circuit breaker, in the substation. In the case in which communication is initiated by the substation, some occurrence in an apparatus unit in any one substation, e. g. the tripping of a circuit breaker, automatically causes the substation to send a signal to the control, and again, with or without a further exchange of signals, the substation will send signals descriptive of the condition of the apparatus units. Furthermore, this same party-line is used for the sending of control signals from the control station to any one apparatus unit in any one substation, for the purpose of changing or confirming its condition or position.

The control station, when desiring to change over the position of a certain circuit breaker in a certain substation sends out firstly a set of impulses distinctive of the substation and then a set of impulses distinctive of the breaker, and finally impulses which, by their polarity, cause the positioning of the breaker. The first set of impulses affects all the receiving circuits in the various substations, while the second set of impulses sets the switch in the one substation. The next impulse received from the control station may be either positive or negative, according as it is desired to close or open the breaker that has already been selected.

Either pulse will cause the substation to switch over from a polarized receiver to a polarized sender to send back to the control station either a positive or negative impulse, indicating respectively that the selected circuit breaker is open or closed.

Thus so long as the connection is maintained at the control station, impulses will be continuously shuttlecocked between the two stations, their polarity depending on the selection made by the operator at the control station end and the position of the circuit breaker at the substation end.

The object of the invention is to enable more information to be conveyed in a simple and expeditious manner than heretofore: in particular, to enable two separate items of information to be conveyed by a single impulse in a train of impulses.

In electric remote control and/or supervisory systems for electric supply networks, such as those shown in the above-mentioned patent specifications, any one substation may contain a plurality of apparatus units such as circuit breakers, perhaps say thirty or forty; and the system may provide for the simultaneous display at the control station of the condition of all the breakers in one substation. Now the control engineer is likely to be interested not so much in the present condition of the individual breakers as in the fact that since he last inspected that substation some particular one or more of the breakers there has changed over. Accordingly, in that embodiment of the invention which will be described, use is made of the invention to convey the information, not only that the several breakers are in their several positions, but that this certain one or these certain ones have changed over since the last time their condition was displayed to the engineer at the control station.

According to the present invention information is conveyed in an electric signalling system by a train of impulses the polarity of each of which indicates the actual condition of a corresponding apparatus unit and the length of which indicates the occurrence or non-occurrence of a previous transient change in the condition of that apparatus unit.

The invention will be described with reference to the accompanying drawings showing the circuit arrangements for a sending equipment installed at a substation of an electric supply network. In the drawings:

Figs. 1A, 1B and 1C when placed together in the relative positions indicated in Fig. 3 with the connecting lines in alignment, illustrate diagrammatically the apparatus and circuit arrangements comprising the sender circuit equipment of a sub-station embodying the present invention;

Fig. 2 shows by means of a time-chart certain operations of a cyclic nature that occur in the sender;

Fig. 3 is a chart showing how Figs. 1A, 1B and 1C are to be placed with respect to each other.

One sender circuit is provided at each substation and performs two main functions:

(a) When an alarm operates or a breaker changes, it sends a signal via the tandem station with which it is associated, to the control station, where it results in a display of the substation number on the control desk, indicating to the control engineer that this substation requires attention. The sender circuit then waits.

(b) When the control engineer is ready to investigate the trouble he causes a signal to be transmitted from the control station to the tandem station and thence to the substation, where it stimulates the sender. When the line is free, the sender transmits the condition of all its alarms, breakers and bus selections and at the same time signals which alarms or breakers have recently changed.

This is described in British Patent No. 489,000.

In the prior British Patent No. 514,991 there is disclosed and claimed an electric signaling system in which different pairs of stations can be connected together by being connected to a channel common to all the stations, characterized in that, when a pair of stations is interconnected, hold signals are continuously transmitted alternately in opposite directions over the common channel, whereby the two stations are held connected to the channel to the exclusion of other stations to which the channel is also available when idle.

That invention was described as being applicable to a system which was in itself quite well known, and which comprised a central station and a number of party-line substations, each station including a signal sender and a signal receiver; when the system is at rest, communication between the central station and any substation can be initiated by either of them. When communication is initiated by the central station, the central station sends out a signal distinctive of the one substation desired, and this signal, although received by all the substations, is effective only at that one. Further identify checking and like signals may be exchanged between the two interconnected stations; but eventually the substation will send back signals descriptive of the condition of each apparatus unit, e. g. circuit breaker, in the substation. In the case in which communication is initiated by the substation, some occurrence in an apparatus unit in any one substation, e. g. the tripping of a circuit breaker, automatically causes the substation to send a signal to the central station, and again, with or without a further exchange of signals, the substation will send signals descriptive of the condition of the apparatus units. Furthermore, this same party-line is used for the sending of control signals from the central control station to any one apparatus unit in any one substation, for the purpose of changing or confirming its condition or position.

As an occurrence, e. g. breaker-trip, in any part of the system is as likely to happen at one moment as another, it becomes necessary to ensure that while a connection between the central control station and a substation is continuing, whether it be for indicating or for control purposes, and whether initiated from the central station or from the substation, no interference shall be caused by such an occurrence, e. g. breaker trip, elsewhere in the system; and it is already known to paralyze all the other signal senders when any one signal sender is in operation by so interlocking the receiver and sender at each station that the sender cannot function while the receiver is functioning.

When the engineer at the control station wishes to change-over a certain circuit breaker in a certain substation from, say, its open to its closed position, he first causes a set of impulses to be sent out which are distinctive of the substation, and then a set of impulses distinctive of the breaker. The "shuttlecock" operation already mentioned then comes into operation, the impulses being short negative ones in both directions. When the control engineer wishes to make the change-over he causes a modification of the shuttlecocking, a short negative impulse being replaced by a long positive impulse.

In addition to these two functions the sender may be arranged to work in conjunction with a receiver circuit enabling breakers to be controlled from the desk at the control station. Also, provision may be made for 2-way telephone calls. A suitable receiver for such interworking forms the subject-matter of our co-pending application Serial No. 477,388.

The reliability of remote control systems depends partly on the satisfactory continuity of the pilot lines that connect each substation to its associated tandem station, and a small current which is referred to as line-proving, is therefore passed continuously over the lines except when signaling is actually in progress. Interruptions of this current, due to broken wires, failure of the signaling battery supply, etc., result in an immediate signaling of the control station.

When the system is quiescent, line proving current is flowing over the pilots $L_1$, $L_2$, Fig. 1A, which connect the stations to a central station or a tandem station. When a circuit breaker trips, a set of contacts OCB in the lower right-hand quarter of Fig. 1B is changed over, causing a signal to be sent to the tandem and thence to the control station: this signal consists of a long break of line-proving, followed by a long negative pulse. At the end of the long negative pulse the substation waits for a signal back, whereupon it sends a report on all the equipments at the substation, in the form of a train of pulses. According to this invention, each pulse, by its position in the train, indicates a certain equipment; the polarity of such a pulse indicates the condition of the equipment; and a lengthening of the pulse beyond the normal indicates that this breaker has changed over since the last report.

The train of pulses is generated as the switch SS, Fig. 1C, steps round, and the polarity of each pulse is determined by the pair of relays PP and PN, one of which is operative by reason of its connection over a wiper of the switch SS to a contact in the bank of that switch which bears a positive potential.

The switch SS is a twenty-five point uniselector, but the number of equipment units which can be accommodated is not limited for this reason, as the switch can make two, three, or more complete rotations one after the other, different banks of the switch being effective at each rotation to signal the condition of the respective equipment units on those banks. Thus, as shown, the switch has eight banks, with their corresponding wipers, and these banks have the following functions: Nos. 1 and 2 pertain to switch-control, No. 1 being a homing bank and No. 2 performing miscellaneous circuit changes; Nos. 3 and 4 pertain to equipment units dealt with in the first rotation of the switch; Nos. 5 and 6 pertain to the equipment units of the second rotation; and Nos. 7 and 8 pertain to those of the third. For the first rotation of the switch SS, relay PP is connected to wiper SS3, and relay PN to wiper SS4; for the second rotation the two relays are switched over to wipers SS5 and SS6, respectively; and for the third rotation they are connected to SS7 and SS8, respectively.

When an alarm becomes operative the circuit functions similarly to that described above when a breaker changes. Momentary alarms have to be locked until the indication is sent, and for this purpose MLA operates from the alarm ALA and holds under the control of LLA. LLA is energised during the checking stage and unlocks MLA which releases with LLA at the end of signalling.

Pilot lines and battery supply

Referring to Figs. 1A, 1B and 1C, the line-proving current is fed to the pilot lines L1 and L2 through the circuit extending from the contact 3 of relay S through high resistance YLR, contact 2 of relay PP, contact 3 of relay PN, line L2, line L1, contact 3 of relay PP, contact 2 of relay PN, contact 4 of relay S, high resistance YLP, contact 2 of relay ZZ, contact 2 of relay LV, and resistance YL to the negative side of the battery. This circuit is continuously maintained when the system is at rest under normal conditions. The relay LV is arranged to release and break this circuit to interrupt the line-proving current if the battery supply fails or if its voltage falls. To this end the relay LV is normally energized and is connected across the battery supply.

Referring to Fig. 1A, the operating winding of LV is the left-hand high resistance winding which is in series with a rheostat R and is connected across the battery through resistance YL. Opposing this is a low resistance winding in series with a ballast lamp BLP connected across the battery through a re-set key K. The function of this second winding is to provide a steady flux cancelling the greater part of the flux in the operating winding but leaving the relay with sufficient ampere turns to hold it operated. When the voltage falls below a preset value the flux in the operating winding is reduced to such a value that in conjunction with the constant opposing flux it will not maintain the relay operated. The point at which LV releases is controlled by varying the series rheostat R.

Since the apparatus to be described employs condensers for indicating the changes and conditions, it is necessary to guard against sudden voltage changes on the battery (due to a breaker tripping on the same battery supply) causing false signals. For this purpose the battery supply to the apparatus is preferably fed via a suitable smoothing filter which may consist of a choke and a condenser.

Breaker or alarm changes

Referring to Fig. 1B, each breaker is fitted with auxiliary contacts OCB forming a change-over set which open and close in unison with the main breaker contacts. The alarm signalling devices ALA only provide a closure and as a change-over is required for circuit reasons, each alarm is provided with an auxiliary relay (ALA', etc.) which introduces the change-over feature. Connected to each alarm and breaker change-over is a pair of condensers in series, the middle point being connected to a group trigger relay LA. When a breaker trips or an alarm becomes operative the corresponding contacts OCB or ALA' change over to charge the second condenser of the pair while leaving the first charged and isolated. The condensers are also individually connected to separate banks of the selector switch SS, one condenser being connected through line C to a contact in each of the banks SS3, SS5 and SS7, as indicated in the drawings. The other condenser similarly is connected through line O to contacts in each of the switch banks SS4, SS6, and SS8, as shown. It will be understood that each equipment unit is allotted its individual, correspondingly positioned, contact points in each of the banks SS3, SS5 and SS7 for its line C and its individual contact point in each of the banks SS4, SS6, and SS8 for its other line O. When a report of the condition of the various equipment items at the substation is being transmitted to the central control station, the relay PP is successively connected to the wipers of the banks SS3, SS5 and SS7 during the first, second and third rotations of the switch SS, and the relay PN is successively connected to the wipers of the banks SS4, SS6 and SS8 during the same first, second and third rotations. Alternative energization of relays PP and PN determines the polarity of the transmitted pulse. For each condition indicating pulse, either one or the other of relays PP and PN will be energized, depending upon which of the two corresponding contacts, one of which is in the set of banks SS3, SS5, SS7 and the other in the set SS4, SS6, SS8, bears a positive potential. This in turn, it will be seen, depends upon the position of the corresponding change-over contact OCB. The polarity of the transmitted pulse thus indicates the actual condition of the equipment item reported.

When either ALA' operates or an auxiliary contact OCB changes over, the relay LA will be caused to operate through the second condenser of the pair, i. e., the condenser in whichever of lines O or C is in contact with the auxiliary contact in its new position. Immediately when relay LA operates it establishes a holding circuit for itself through its left-hand coil, its contact 1 and contacts 1 of relay S. Closing of contact 1 of relay LA causes relay S to operate from the circuit extending through the left-hand winding of relay LA, contact 1 of relay LA, contacts 1 of relay S, winding of relay S, and contact 6 of relay Z to positive. Operation of relay S establishes a holding circuit for relay S through its front contact 1 and resistance YS. The relay S thus remains operated independently of the relay LA so long as the relay Z is unoperated. At the same time, operation of relay S opens the circuit through the left-hand coil of relay LA which is thus restored to its normal condition so that it is free to respond to a subsequent breaker change or alarm. Operation of relay S closes its contact 2 to establish a circuit which causes relay PI to be operated. This circuit extends from the negative connection to the winding of PI through the winding of PI, back contact 5 of relay ST, the wiper of switch back SS2, contact 1 of bank SS2, back contact 2 of relay J, contact 1 of relay ZZ, contacts 2 of relay ST, contact 2 of relay S, contact 1 of relay IN, and contact 1 of relay IP to positive. The line-proving current through the pilot lines L1, L2, is interrupted by contact 3 of relay S upon the operation of relay S. Simultaneously, the relay ST begins to operate. This relay operates slowly, due to its short-circuited winding, to permit the relay PI to be operated before the relay ST has operated. Relay ST is operated by a circuit extending from the negative connection to its operating coil, through the operating coil, back contact 1 of relay ST, the wiper of SS2, contact 1 of switch bank SS2, back contact 2 of relay J, contact 1 of relay ZZ, contacts 2 of relay ST, contact 2 of switch S, contacts 1 of relay IN, contact 1 of relay IP to positive. The operation of relay ST opens the operating circuit for relay PI to release this relay. A timing circuit has now started to operate, under the control of relay PI, to time the duration of the interruption of line-proving current and the length of the subsequent long negative pulse.

PI is a pendulum relay making 20 complete swings per second, and continuing to impulse for some time after its last being operated;

X and Y are a combination, of which relay X changes over with each release of PI and relay Y changes over with each operation of PI; so that each of these relays performs ten operate-release cycles per second, the two being 90° out of phase;

CX and CY are a combination depending on relay X as the combination X, Y depends on PI, thus performing five cycles per second, 90° out of phase with each other, this pair operating only for the production of a long pulse;

DX and DY are a combination similarly depending on relay CX; this pair operating only for the production of a very long pulse.

Upon the first operation of relay PI neither relay X nor relay Y is affected because of the slow operation of relay ST. When ST has completed its operation, it releases relay PI by opening of its contacts 5. Relay PI is then free to vibrate under its own momentum. When relay PI completes its swing to the right as seen in Fig. 1A, it closes a circuit to operate relay X which extends from the negative connection to resistance YX, through resistance YX, operating winding of relay X, back contact 1 of relay Y, back contact of relay PI, armature of PI, front contact 1 of relay ST, front contact 2 of relay ST, contact 2 of relay S, contacts 1 of relay IN, contact 1 of relay IP to positive. Relay PI then operates again under its own momentum. Relay X holds through resistance YX, contact 1 of relay X, the front contact of relay PI, and armature of PI to positive through the circuit traced above. Relay Y operates through the circuit extending from the negative connection to resistance YE through resistance YE, winding of relay Y, contact 1 of relay X, front contact of relay PI, and armature of PI to positive. When the armature of relay PI next swings to the right under its own momentum, relay X releases at the front contact of relay PI. Relay Y holds through the circuit YE, Y, front contact 1 of relay Y, back contact of relay PI, and armature of PI to positive as described above. Simultaneously an energizing circuit for relay PI is momentarily established through the negative connection to resistance YP, resistance YP, winding of relay PI, contact 3 of relay X, back contact of relay PI and armature of PI to positive. As the armature of relay PI swings to the left again, the relay Y is released by the opening of the back contact of relay PI. When the armature of relay PI next swings to the right, the relay X is operated as it was in the first cycle through the circuit including contact 1 of relay Y and the back contact of relay PI, as described above. The vibration of relay PI continues in this fashion to cause the relays X and Y to perform successive operate-release cycles.

The relationship between the vibrations of the relay PI and the operated and released conditions of relays X and Y will be seen more clearly from the chart of Fig. 2 which represents graphically the operated and released conditions of these relays with respect to time. It will be seen from this chart that the relay X vibrates between its operated and its released condition at a frequency which is one-half the frequency of the relay PI.

The pair of relays CX and CY, which make up a further part of the timing circuit, in turn vibrate between their operated and released conditions at a frequency which is one-half the frequency of the relay X, as will be seen from the following description of the circuits of the pair of relays CX, CY and from the chart of Fig. 2. Upon the first operation of relay X, relay CC is operated through the circuit extending from the winding of relay CC, back contact 1 of relay CY, front contact 2 of relay X, front contact 2 of relay ST, contact 2 of relay S, contacts of relay IN, contact 1 of relay IP to positive. Relay CX operates from the circuit extending from the negative connection to resistance YCC, through resistance YCC, contact 1 of relay CC, winding of relay CX, back contact 1 of relay CY and contact 2 of relay X to positive as previously described. During this phase, the relay CY remains released. When relay X is released, the relay CX holds through the circuit extending through the operating winding of relay CX, contact 2 of relay CX, the back contact of relay X, front contact 2 of relay ST, contact 2 of relay S, contacts 1 of relay IN, and contact 1 of relay IP, to positive. At the same time relay CY is operated through the circuit extending from the negative connection to its winding through contact 2 of relay CX, the back contact 2 of relay X to positive through the circuit just traced. Upon the subsequent operation of relay X, relay CX releases because both the back contact 2 of relay X and the back contact 1 of relay CY are isolated. Relay CY holds through front contact 1 of relay CY, front contact 2 of relay X to positive through the circuit previously traced. When relay X next releases, relay CY releases and relay CX remains released because both armature 2 of relay X and armature 2 of relay CX are isolated. Successive operate-release cycles of relays CX and CY follow in this way upon each subsequent change over of relay X, in the relationship indicated in the chart of Fig. 2.

The relay pair DY, DX operate in a similar manner to the relay pair CX, CY, depending for their operation upon the relay CX. When the relay CX operates for the first time, the relay DX is operated by the circuit extending from the negative connection to its operating winding through the winding, back contact 4 of relay DY, the front contact 1 of relay CX, contact 3 of relay ST, contact 1 of relay ZZ, back contact 2 of relay J, contact 1 of switch bank SS2, the wiper of this switch bank, front contact 2 of relay ST, contact 2 of relay S, contacts 1 of relay IN and contact 1 of relay IP, to positive. In this phase the relay DY is released. Upon the first release of relay CX, relay DY is operated by the circuit extending from the negative connection to relay DY, through the winding of relay DY, contact 1 of relay DX, contact 1 of relay CX, contact 3 of relay ST, contact 1 of relay ZZ, back contact 2 of relay J, contact 1 of switch bank SS2, the wiper of this switch bank, front contact 2 of relay ST, contact 2 of relay S, contacts 1 of relay IN and contact 1 of relay IP, to positive. The relay DX holds through the circuit extending through contact 1 of relay DX, contact 1 of relay CX, contact 3 of relay ST, to positive as just described. Upon the next operation of relay CX, relay DX releases at contact 1 of relay CX, and the relay DY holds through back contact 4 of relay DY, contact 1 of relay CX, and contact 3 of relay ST. Following the next release of relay CX, relays DX and DY are both released because both armature 1 of relay DX and armature 1 of relay CX are isolated. Relays DX and DY continue to perform operate-release cycles in this manner in the time relationship shown in the chart of Fig. 2.

During the performance of this timing operation by relays PI, XY, CX, CY, DX and DY it is to be noted that the relay S remains operated so that no line-proving current can flow. Also, the trigger relay LA has been freed for the reception of any subsequent breaker change or alarm which may occur. The relay ST also remains operated and, at its contact 6, prepares an alternative locking circuit for the trigger relay LA so that any breaker trip or alarm which may occur during the sending of the report can be stored until the line is again free.

The switch SS is provided with an operating circuit extending from the negative connection to SS (Fig. 1C) through contact 3 of relay DX, contact 3 of relay CX, contact 4 of relay Y, the front contact 5 of relay ST, front contact 2 of relay ST, contact 2 of relay S, the contacts of relay IN, and contact 1 of relay IP to positive. The operating mechanism of SS will be energized when relays DX and CX are released simultaneously with the operation of relay Y. This combination of events occurs for the first time in the fourth cycle as will be observed from the chart of Fig. 2. When the switch SS steps to its second position, the relay PN is connected to the wiper of switch bank SS4, upon the next subsequent operation of relay X, to energize the relay PN through a circuit extending from the battery connection to its operating winding through the operating winding, contact 5 of relay X, back contact 2 of relay HA, wiper of switch bank SS4, and contact 2 of switch bank SS4 to positive. Relay PN prepares a holding circuit for itself, through its contact 1, which is completed, when relay Y is operated, at contact 3 of relay Y, or, when relay CY is operated, at contact 2 of relay CY, or, when relay DY is operated, at contact 2 of relay DY. The holding circuit for relay PN, therefore is not broken by the timing relays, as will be seen from the chart of Fig. 2, until a time in the eighth cycle, when for the first time no one of relays X, Y, CY and DY is operated.

While the relay PN is operated, the pilot line L1 is connected to positive through the back contact 3 of relay PP, and front contact 2 of relay PN. At the same time, the pilot line L2 will be connected to negative whenever any one of relays Y, CY, and DY is operated, through front contact 3 of relay PN and either contact 2 of relay Y, contact 3 of relay CY or contact 1 of relay DY. Some one of these relays Y, CY, and DY is operated continuously through the seventh cycle.

The pulse of negative polarity thus continues to be sent out over the lines L1, L2 until relay Z operates to terminate this pulse and reset the circuit to normal condition. For relay Z to operate, the relay DX must be released, the relay DY operated and the switch SS in its second position. It will be observed from the chart of Fig. 2 that this combination of conditions does not occur until the 7th cycle, when the relay DX releases for the second time. At this time the relay Z operates through the circuit extending from the battery connection to the winding of relay Z through the winding of relay Z, contact 2 of relay CK, contact 3 of relay DY, contact 2 of relay DX, contact 2 of SS1, wiper of SS1 to ground.

When relay Z operates it establishes a holding circuit for itself through its contacts 1, the contacts of switch bank SS1, the wiper of switch bank SS1 to positive. Operation of relay Z also operates relay ZZ, at contact 2 of relay Z, for a purpose which will be described later. At the same time the relay S is released at contact 6 of relay Z. Release of relay S causes all of the relays PI, X, CX, DY and ST to be released at contact 2 of relay S. It should be noted that the holding circuit for relay PN is now maintained at contact 4 of relay Z and the connection to line 2 is now completed through contact 3 of relay Z. The continuation of the negative pulse is therefore dependent entirely upon the operated condition of relay Z. The release of relay ST establishes a circuit which causes the switch SS to be returned to its first or normal position; this circuit extends from the operating mechanism of SS through back contact 6 of relay ST and the contacts and wiper of switch bank SS1 to positive. Consequently the switch SS now returns to its normal position. When the wiper of switch SS1 reaches its normal position, the relay Z is released because the holding circuit for this relay is broken at the wiper of switch bank SS1. When relay Z releases, it unlocks relay PN at contact 4 and terminates the long negative pulse at contact 3. The release of relay Z also releases the relay ZZ at contact 2 of relay Z. While relay ZZ was operated it served to prevent application of line-proving current to L1 at contact 2 of relay ZZ. To prevent re-application of the line-proving current to the pilot lines immediately upon the termination of the long negative pulse relay ZZ has a very long releasing lag of the order of 3 seconds, and not until it eventually falls back is the line-proving circuit reapplied to the line. The reason for giving the long delay between the disconnection of the calling pulse and the re-application of the line-proving conditions is to ensure that the equipment at the tandem station and the control station has returned to normal.

The sender circuit is now at normal and ready to give another calling signal or to receive the check back signal from the control station.

The calling signal

After the removal of the line proving current there is thus a long disconnection followed by a long negative pulse. The disconnection of the line proving current actuates the tandem station equipment which in turn signals the control station that the substation concerned require attention. The following negative pulse adds the information that the disconnection of the line proving current is not due to a failure of the line or battery.

Check back from control station—Seizure from control station

The call from the central control station consists of a positive pulse on pilot line L1. This pulse operates relay IN through a circuit extending from line L1 through back contact 3 of relay PP, back contact 2 of relay PN, winding of relay IN, back contact 2 of relay PP, back contact 3 of relay PN to L2. Operation of relay IN causes relay CK to operate through the circuit extending from the positive connection to relay CK through the front contact 1 of relay IN, and contact 1 of relay IP to positive. Relay CK closes a holding circuit for itself extending from the battery connection to relay CK through the operating winding of relay CK, contact 5 of relay Z and contact 1 of relay CK to positive. The circuits of relays Z and ZZ are opened at contacts 2 and 3 respectively of relay CK and the relay S is operated at contact 4 of relay CK. Relay S prepares a circuit for relays PI and ST at contact 2, disconnects line proving from L1 and L2 at contact 3, and provides a holding circuit for itself, as described above. If the relay S is already operated at this time, the relay IP operates from the calling pulse through S4, and opens the circuit of relays PI, X, CX and DX at contact 1 of relay IP so that a timing cycle cannot begin. When the incoming positive pulse is removed from L1, the relay IP releases, if it is operated, and at the same time the relay IN releases and completes the circuit for relays PI and ST through its back contact and contact 1 of relay IP. Relay ST performs the same functions as described above under "Breaker or alarm changes" starting the sequence of operations shown on the chart of Fig. 3.

The first six cycles are exactly as before, with a long negative pulse commencing in the fifth cycle. The difference now however is that in the seventh cycle, relay Z is prevented from operating because contacts ck2 are open. In the eighth cycle the long negative pulse is terminated upon the release of relay Y, and at the same time the switch SS steps from position (2) to position (3). In each of the cycles that follow, viz. cycles 9 to 31 for one complete rotation of the switch, a pulse is sent to the control station corresponding to each of the positions 3 to 25 of the switch SS; these pulses are positive or negative as already described.

Long pulse to indicate an equipment which has recently changed

Assume that the breaker OCB which is associated with contacts No. 15 in the banks SS3 and SS4 of switch SS, has opened since the last report-train was sent. Then there will be direct positive applied to contact 15 in bank SS4 as already described; but there will also be a charge left on the first, isolated condenser which is connected to contact 15 in bank SS3. Consequently, when at the end of the 20th cycle switch SS steps from position (14) to position (15), relay PN is operated to make the next pulse a negative one, but in addition relay SS3 connects relay CC to be operated from the charge on the condenser in the circuit: the first condenser, SS3, HA3, X4, PP, negative, CC, a rectifier, the first condenser. Relay CC locks. The operation of relay CC causes CX and CY to perform a cycle, during which the switch SS is prevented, at CX3, from energising.

The switch is thus held in position (15) throughout the 21st and 22nd cycles, and the negative pulse to line is thus made three times its normal length. If more than one changeover of the equipment unit has occurred since the last report, it will be observed that the pulse nevertheless will be lengthened, due to the presence of a condenser in each of the lines O and C.

This distinguishing feature is used to give suitable signal at the control station that this breaker has changed since the previous check back was sent.

Second and third rotations of the switch

When switch SS reaches position 24 on its first run, relay J is operated by the circuit extending from the battery connection to relay J through the winding of relay J, contact 24 of switch bank SS2, front contact 2 of relay ST, contact 2 of relay S, the back contact of relay IN to positive, and locks at contact 1 of relay J. After the last indication has been given in position (25), the switch steps to position (1), where relay HA operates from the circuit extending from the negative connection to relay HA through the winding of relay HA, back contact 2 of relay JA, front contact 2 of relay J, contact 1 in switch bank SS2, front contact 2 of relay ST, contact 2 of relay S, the contacts of relay IN and relay IP to positive and locks at contact 1 of HA, transferring the PP and PN relays from wipers SS3 and SS4 to wipers SS5 and SS6. The switch now makes a second rotation as before, and when outlet 22 is reached, relay JA operates and locks. After the last indication pulse has been given in position (25) on the rotation of the switch, its wipers step to position (1), where relay HB is operated by the circuit extending from the negative connection to relay HB through the winding of the relay, front contact 2 of relay JA, front contact 2 of relay J to contact 1 of switch bank SS2 and positive. Relay HB locks and transfers the PP and PN relays from SS wipers 5 and 6 to 7 and 8 respectively. The SS switch now makes its third rotation giving indications as described. When outlet 20 is reached JB operates, locks at JB1, and prepares Z. After the last indication pulse has been given in position 25 SS steps to outlet 1, where another negative pulse of normal length is applied to L1 through the operation and release of PI, X, Y and PN. SS now steps to outlet 2 where a very long pulse is given in the manner described under "Seizure from control station" cycles 1 to 7 except that when DX releases in cycle 7 Z is energised. Relay Z holds itself, maintains PN, releases S and CK and energises ZZ. S opens the circuit of ST which in turn completes the homing circuit for SS via SS1 bank. The circuit resumes its normal condition, Z releasing when SS reaches outlet 1 and the negative pulse is removed from L1. ZZ releases after a very long delay, being of the order of 3 seconds, and then reapplies the line-proving conditions to the line.

The first, second and third rotations are distinguished by code pulses in position (3) of the switch. For the first rotation it is a normal negative, for the second rotation a normal positive, and for the third a long negative.

*Fault in normal operating circuit of Z relay*

Should a fault occur in the normal circuit for energising the Z relay it is important to provide alternative means for operating this relay as otherwise continuous sending would be applied to the line, thus preventing other sub-stations associated with the same tandem station from originating or receiving indications. For this reason a combination of J, JA and JB, contacts is associated with a second winding of relay Z and outlets 19, 21 and 23 on SS bank 2.

What is claimed is:

1. A substation sender adapted to be operated in a remote control system, under the control of an electrical signal, for sending a report from a substation to a central station of the condition of a plurality of apparatus units at the substation, comprising a circuit line to the central station, relay means for each unit for producing an impulse of a polarity corresponding to the actual condition of the unit, sequence switch means under the control of said signal, including two wipers sweeping corresponding banks of contacts, for connecting said relay means consecutively with said circuit line to produce a corresponding train of impulses, a sending relay connected to each wiper, said relay means including a set of change-over contacts controlled by the apparatus unit and controlling said sending relays to operate said sending relays alternatively in accordance with said set of changeover contacts completing one circuit or the other through the banks swept by the wipers, the set of changeover contacts being connected with a pair of condensers so that on the occurrence of a unit change-over, one condenser is newly charged and the other is left charged, and means, operated by the charge on the condenser which is left charged, for lengthening the corresponding impulse upon the next sweep of the wipers.

2. A substation sender adapted to be operated in a remote control system, under the control of an electrical signal, for sending a report from a substation to a central station of the condition of a plurality of apparatus units at the substation, comprising a circuit line to the central station, relay means for each unit for producing an impulse of a polarity corresponding to the actual condition of the unit, sequence switch means under the control of said signal, including two wipers sweeping corresponding banks of contacts, for connecting said relay means consecutively with said circuit line to produce a corresponding train of impulses, a sending relay connected to each wiper, said relay means including a set of changeover contacts controlled by the apparatus unit and controlling said sending relays to operate said sending relays alternatively in accordance with said set of changeover contacts completing one circuit or the other through the banks swept by the wipers, the set of changeover contacts being connected with a pair of condensers so that on the occurrence of a unit changeover, one condenser is newly charged and the other is left charged, and a polarized relay connected to said condensers to be operated by the charge on the condenser which is left charged, for lengthening the corresponding impulse upon the next sweep of the wipers.

3. A substation sender adapted to be operated in a remote control system for sending a report from a substation to a central station of the condition of a plurality of apparatus units at the substation, comprising a circuit line to the central station, relay means for each unit for producing an impulse of a polarity corresponding to the actual condition of said unit, sequence switch means for connecting each of said relay means consecutively with said circuit line to produce a corresponding train of impulses, and a pair of condensers connected with the relay means so that upon the occurrence of a changeover of a unit one condenser is newly charged and the other is left charged, and means, operated by the charge on the condenser which is left charged, for lengthening the corresponding impulse upon the next operation of said sequence switch means.

4. A substation sender adapted to be operated in a remote control system for sending a report from a substation to a central station of the condition of a plurality of apparatus units at the substation, comprising a circuit line to the central station, relay means for each unit for producing an impulse of a polarity corresponding to the actual condition of said unit, sequence switch means for connecting each of said relay means consecutively with said circuit line, to produce a corresponding train of impulses, and a condenser so connected with the relay means that upon the occurrence of a changeover of the unit the condenser is left charged, and means, operated by the charge on the condenser for lengthening the corresponding impulse upon the next operation of said sequence switch means.

EDWARD ALBERT HENRY BOWSHER.
HAROLD MOUNTJOY MUSCHAMP
D'ASSIS-FONSECA.
HUGH JENNINGS WARD.